United States Patent [19]
Shibayama

[11] Patent Number: 5,310,033
[45] Date of Patent: May 10, 1994

[54] LOCK-UP TYPE TORQUE CONVERTER

[75] Inventor: Takashi Shibayama, Isehara, Japan

[73] Assignee: Nissan Motor Co., Ltd., Yokohama, Japan

[21] Appl. No.: 892,823

[22] Filed: Jun. 5, 1992

[30] Foreign Application Priority Data

Jun. 7, 1991 [JP] Japan .................... 3-136132

[51] Int. Cl.$^5$ ............................................ F16H 45/02
[52] U.S. Cl. ....................... 192/3.29; 192/82 T; 192/113 BT
[58] Field of Search .................... 192/3.29, 3.3, 82 T, 192/113 B, 113 BT; 251/11; 236/93 R

[56] References Cited

U.S. PATENT DOCUMENTS

| 4,423,803 | 1/1984 | Malloy | 192/3.29 |
| 4,930,457 | 6/1990 | Tamai | 192/82 T X |

FOREIGN PATENT DOCUMENTS

| 59-83854 | 5/1984 | Japan | 192/3.29 |
| 61-167767 | 7/1986 | Japan | 192/3.3 |
| 63-37859 | 3/1988 | Japan | . |

OTHER PUBLICATIONS

Yoshizawa et al. "Proposal of New Criteria and Test Methods for the Dynamic Performance of ATF", SAE Technical Paper Series, 900810, Int'l. Congress and Expo., 1990, pp. 1-8.

Primary Examiner—Richard M. Lorence
Attorney, Agent, or Firm—Foley & Lardner

[57] ABSTRACT

A lock-up and slip lock-up type torque converter for an automotive transmission comprises a pump impeller associated with an input shaft of an automotive transmission, a turbine runner associated with an output shaft of the transmission and a lock-up clutch capable of directly connecting the input and output shafts, the lock-up clutch further has an orifice formed in the vicinity of a facing communicating with a fluid chamber of the lock-up clutch. A flow restricting bimetal portion is provided for operatively reducing a size of the orifice according to low fluid temperature detected at a facing portion of the lock-up clutch and increasing a size of the orifice according to high fluid temperature in the lock-up clutch.

10 Claims, 3 Drawing Sheets

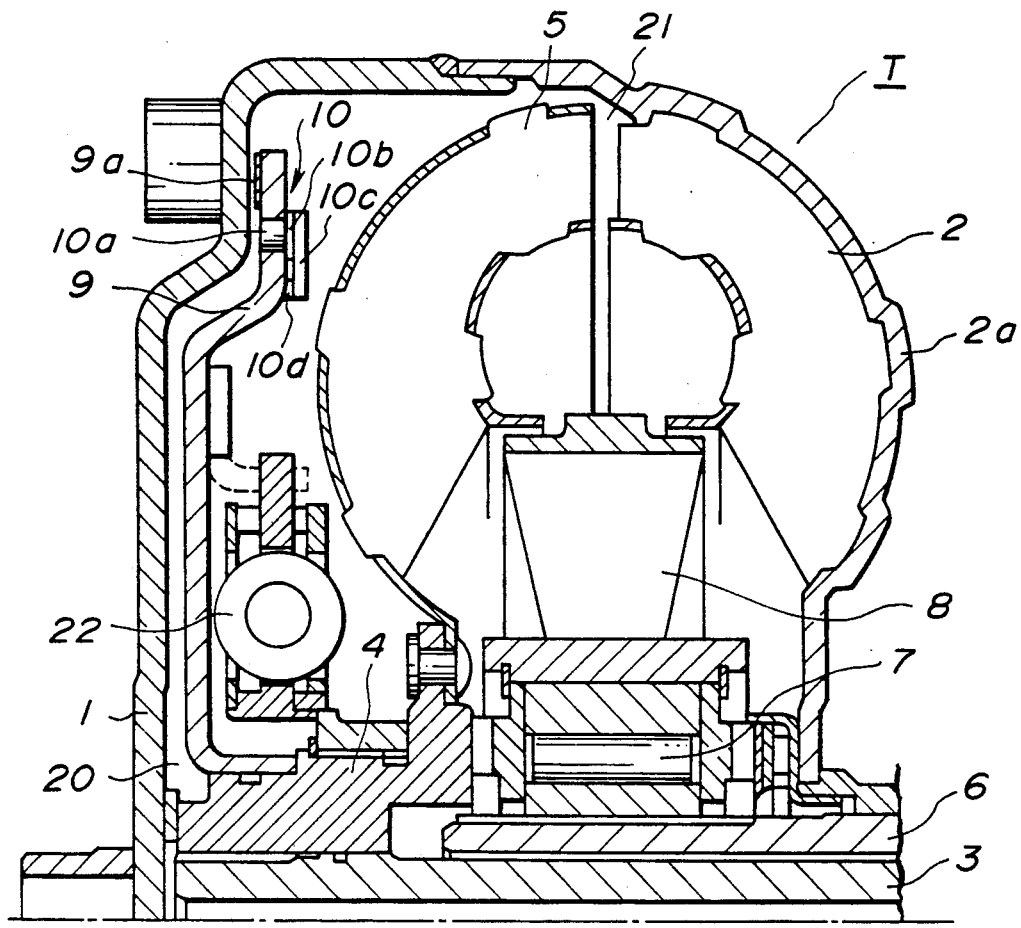
FIG.1
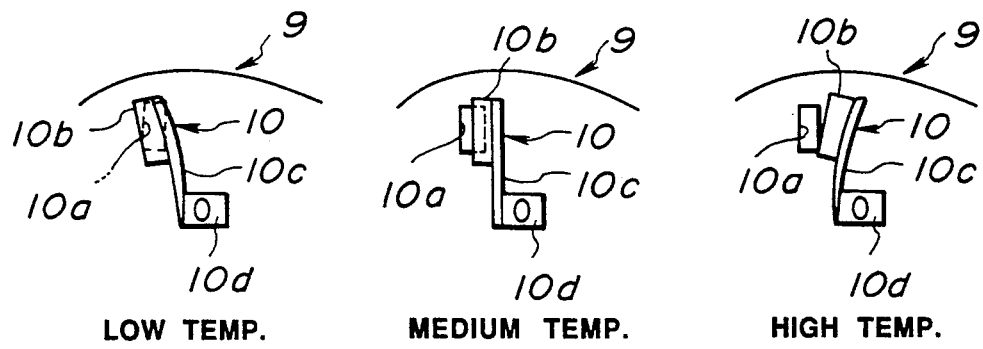
FIG.2(A)   FIG.2(B)   FIG.2(C)

5,310,033

LOCK-UP TYPE TORQUE CONVERTER

BACKGROUND OF THE INVENTION

1. Field of the Invention

The present invention relates generally to a lock-type torque converter. Particularly, the invention relates to a lock-up type torque converter for an automotive transmission.

2 Description of the Prior Art

Conventionally, a lock-up torque converter for use in automotive transmissions, etc., are well known. For example, Japanese Utility Model Application, first publication (unexamined) 63-37859 discloses a typical example of such a conventional lock-up type torque converter. According to the above-mentioned Japanese Utility Model application, in order to ensure durability of a facing of a lock-up clutch which is frequently subjected to heat generated during lock-up and slip lock-up operations, a fixed orifice is provided at a circumferential portion of the facing in order to allow flow of automatic transmission fluid (ATF), to contact the facing for cooling thereof.

However, since the fluid flows from the time of engine starting, the fluid takes longer to reach an optimal running temperature. In conventional lock-up type torque converters, the temperature rises to an optimal running temperature fairly slowly and, for this reason, slip lock-up control cannot be effectively implemented immediately after engine starting. If slip lock control is effected before the temperature is sufficiently high, shuddering of the lock-up clutch may occur causing a loss of vehicle traction.

SAE paper No. 900810 discusses the relationship between temperature and shudder in automatic transmissions. According to the SAE paper, severe shudder was found at starting temperatures while no shudder is evident at running temperatures.

Therefore, it has been required to provide a lock-up clutch in which ATF temperature may rise quickly for reducing a period of time in which shuddering may occur after engine starting while maintaining the cooling characteristics of conventional fixed orifice type arrangements.

SUMMARY OF THE INVENTION

Therefore, it is an object of the present invention to provide a lock-up torque converter, with a fluid flow orifice for supplying cooling fluid, which orifice enhances temperature rising characteristics for reducing a duration of shuddering in a lock-up type torque converter after engine starting.

In order to accomplish the aforementioned and other objects, a lock-up type torque converter comprises: a pump impeller associated with an input shaft, a turbine runner associated with an output shaft, a lock-up clutch capable of directly connecting the input and output shafts, the lock-up clutch further having an orifice formed therein in the vicinity of a facing thereof, the orifice communicating with a fluid chamber of the lock-up clutch, and flow restriction means for operatively reducing a size of the orifice according to low fluid temperature in the lock-up clutch and increasing a size of the orifice according to high fluid temperature in the lock-up clutch.

BRIEF DESCRIPTION OF THE DRAWINGS

In the drawings:

FIG. 1 is a cross-sectional view of a lock-up type torque converter according to a first embodiment of the invention;

FIGS. 2(A), 2(B) and 2(C) show operating modes of a flow restriction member of the torque converter of FIG. 1;

DESCRIPTION OF THE PREFERRED EMBODIMENT

Figure 3:
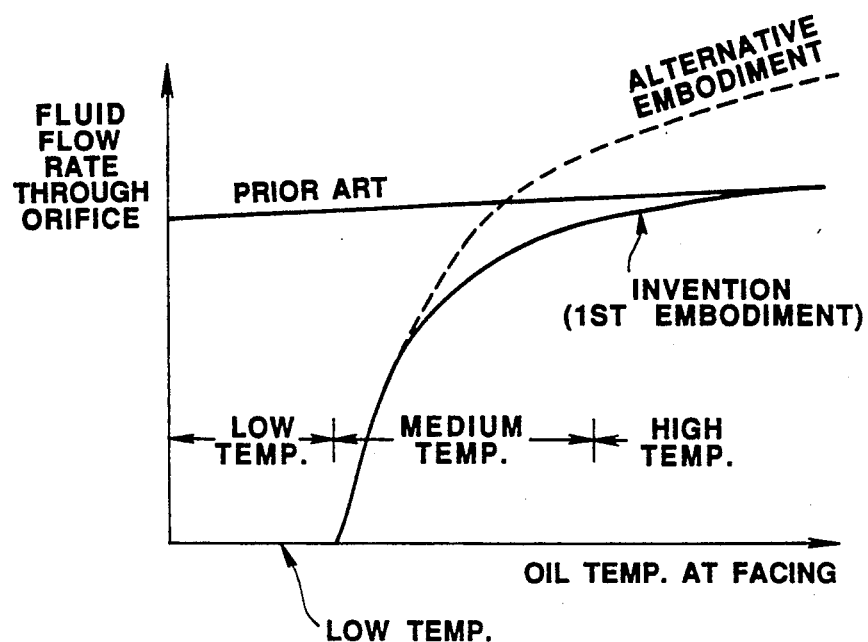
FIG. 3 is a graph showing characteristics of the present invention as compared to the prior art in relation to flow rate and fluid temperature.

Referring now to the drawings, particularly to FIG. 1, a lock-up up type torque converter T according to a first embodiment of the invention, receives an end of an engine crankshaft (not shown) through a converter cover 1 at a pump impeller 2. A transmission input shaft 3 is connected with a turbine hub 4 which is connected to a turbine runner 5. Arranged within an inner diameter of the turbine runner 5 and the pump impeller 2, a stator 8 is provided. A one way clutch 7 is mounted between a pump casing 6 and the stator 8. Between the converter cover 1 and the turbine hub 4 a lock-up clutch 9 is provided which is movable in an axial direction. The lock-up clutch 9 further comprises a facing 9a. In addition the lock-up clutch 9 has a cooling orifice assembly 10 formed therein slightly radially inward in the facing 9a. The cooling orifice assembly 10 is constructed so as to be fully closed at a low fluid temperature condition and to be fully open at a high fluid temperature condition so as to provide cooling. The cooling orifice assembly 10 communicates between a converter fluid chamber 21 and a lock-up fluid chamber 20.

A torsion spring 22 is installed between the lock-up clutch 9 and the turbine hub 4 for providing rotational torque fluctuation.

Referring to FIGS. 1 and 2 A-C, the operation of the cooling orifice assembly 10 will be explained hereinbelow. The cooling orifice assembly 10 is comprised of an orifice 10a communicated with the converter fluid chamber 21 and a lock-up fluid chamber 20 via a shutter 10b. The shutter 10b is arranged on the plane of the lock-up clutch 9 for covering the orifice 10a. The shutter is attached at one end thereof to a arm portion 10c which is made of bimetal or the like. The arm portion 10c is attached, by welding for example, to a surface of the lock-up clutch 9 via a base 10d.

Hereinbelow, an operation of a torque converter according to the above-described first embodiment will be described in detail.

(A) At Low Fluid Temperature

Referring to FIG. 2(A), at the time of engine starting, fluid temperature in the torque converter T is substantially low. The fluid temperature is detected by the cooling orifice assembly 10 and in a low fluid temperature condition the orifice 10a remains closed.

In this state, when the lock-up clutch 9 is controlled so as to become operational, from the beginning to the end of a lock-up clutch operation, substantially quick heating in the vicinity of the facing 9a due to rotational friction thus heating the fluid. In FIG. 3, shown by a heavy black line, the fluid temperature/flow rate characteristics during lock-up clutch operation are shown. As can be seen from the drawing, at the time of engine starting, fluid flow through the orifice is blocked until the facing reaches a required minimum temperature for preventing shudder.

Figure 4:
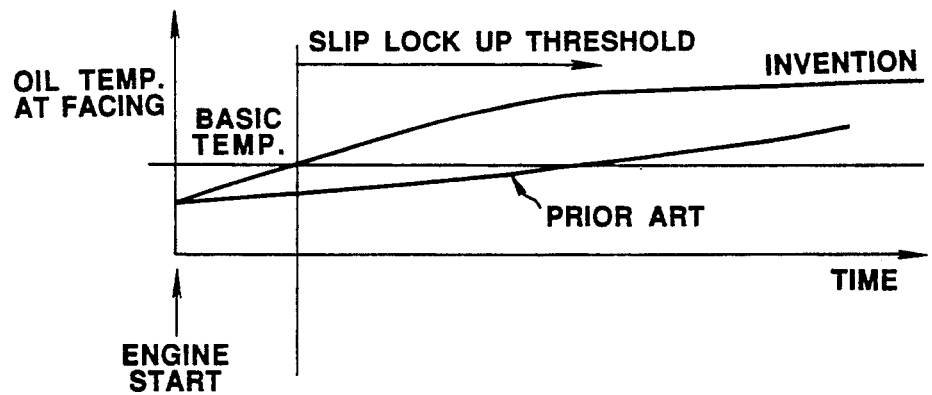
FIG. 4 is a graph showing fluid temperature increase characteristics of the present invention as compared with the prior art.

Thus, heating of the lock-up clutch is accelerated as the orifice remains closed while the fluid is at low temperature and, as seen in FIG. 4, the time for heating the fluid to a standard running temperature, and a duration of shuddering, is reduced. Further, referring to FIG. 4, a fluid temperature required for slip lock-up operation is shown for the invention as compared with the prior art.

(B) At Medium Fluid Temperature

Referring to FIG. 2(B), when the temperature of fluid is rising in the vicinity of the facing 9$1$ of the lock-up clutch 9, this is sensed by the cooling orifice assembly for causing the shutter 10b to move, partially opening the orifice 10a, to allow limited flow of cooling fluid in the vicinity of the facing 9a.

In the above condition, when either slip lock-up or total lock-up operation is initiated, and heating in the vicinity of the facing 9a occurs due to rotational friction, thus, as seen in FIG. 3, the orifice 10a is gradually opened to allow an increased flow rate of cooling fluid.

(C) At High Fluid Temperature

From the time of engine starting, as the engine runs for an extended time, the temperature of fluid in the converter T rises gradually to a high temperature. At this time, the high temperature is sensed at the cooling orifice assembly and the shutter 10b is moved aside completely from the orifice 10a for completely opening the orifice 10a.

In this condition, on initiation of slip lock-up or total lock-up, heating occurs due to rotational friction and, as mentioned above, the orifice 10a is completely opened for allowing a maximum flow rate of cooling fluid in the vicinity of the facing 9a to provide, as seen in FIG. 3, cooling characteristics equal to those of the fixed orifice type prior art arrangements. Further, since the temperature at the facing is thus controlled, degradation of the facing is prevented and durability thereof is enhanced.

Thus according to the above-described embodiment, at low fluid temperatures fluid heating may be achieved more quickly than with conventional, fixed orifice arrangements and, at high fluid temperatures, durability of the facing is improved.

Further, according to provision of the cooling orifice assembly 10 including the orifice 10a, the shutter 10b and the bimetal arm portion 10c, flow rate variation is regulated smoothly, especially at medium fluid temperatures when the temperature of the fluid is in transition from low to high.

In addition, since the limited moves gradually in relation to the orifice, the operation of the bimetal portion is not affected by outwardly directed force due to the rotation of the lock up clutch. That is due to the radial orientation of the bimetal portion, which is attached to the lock-up clutch 9 at a portion radially inward of the portion 10b which covers the orifice. The size of the orifice may always be accurately regulated according to oil temperature regardless of centrifugal, or other forces, acting on the orifice assembly 10 due to rotation of the lock-up clutch.

Figure 5:
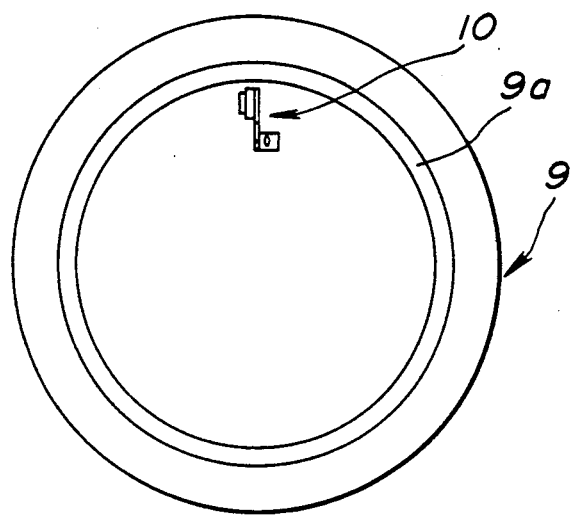
FIG. 5 is a plan view showing a second embodiment of a lock-up clutch according to the invention.

Hereinbelow, a second embodiment of the invention will be described with reference to FIG. 5. The second embodiment also applies to a lock-up clutch for a lock-up torque converter. As seen in the drawing, according to the second embodiment, the shutter 10b, the bimetal arm portion 10c and the base 10d are mounted on the same side of the lock-up clutch as the facing 9a. In other respects, the operation and arrangement of the second embodiment are the same as the above described first embodiment. With the arrangement of the second embodiment, temperature detection accuracy near the facing is improved. Further, all the advantages of the first embodiment are present.

Figure 6:
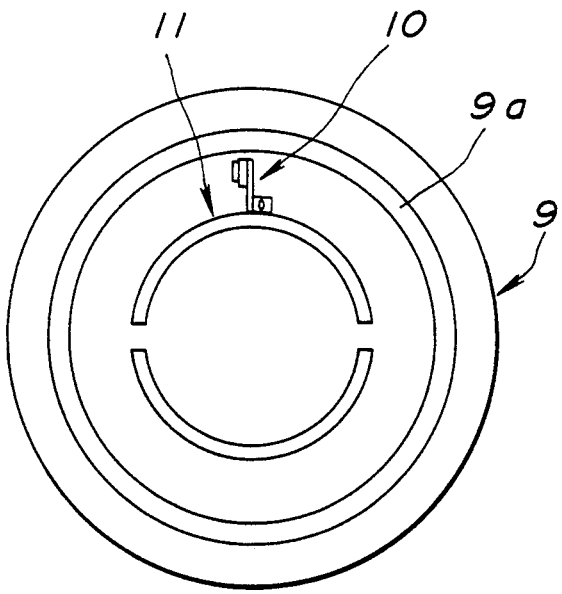
FIG. 6 is a plan view showing a third embodiment of a lock-up clutch according to the present invention.

Hereinbelow, a third embodiment of the invention will be described with reference to FIG. 6.

Like the above-described second embodiment, in the third embodiment the cooling orifice assembly 10 is installed on the side of the facing 9a. Further, a check portion 11 is disposed circumferentially inward of the base 10d of the cooling orifice assembly.

According to the above arrangement, in addition to the advantages of the previous two embodiments, from an engine start time, a time required for working fluid to reach normal running temperature is further reduced. Further, provision of the check portion 11 prevents a condition in which, when working fluid is heated, higher temperature fluid rises to an upper surface of the fluid and cooler fluid sinks to a lower level.

Thus according to the present invention, various advantages are present over conventional arrangements. Further, according to the present invention various alterations may be made for altering flow characteristics. For example, referring to FIG. 3, although the solid line representing the flow characteristics of the first embodiment shows a flow rate at high fluid temperatures which is equal to conventional fixed orifice type arrangements, the orifice 10a shutter 10b and the bimetal arm portion 10c may be suitably engineered to alternatively provide a higher flow rate at high temperature for further enhancing cooling characteristics as shown by a dotted line in FIG. 3.

Also, alternatively to using bimetal for the arm portion 10c, a shape memory alloy may also preferably be utilized.

Further, although the above described embodiments feature a gradually opening shutter to provide a smooth increase in flow rate according to fluid temperature, the cooling orifice assembly may also be provided to operate in an ON/OFF type fashion. That is to say, the shutter may remain closed, or partially open until a particular temperature threshold is achieved upon which the orifice may be made to open completely.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A lock-up type torque converter, comprising:
   a pump impeller associated with an input shaft;
   a turbine runner associated with an output shaft;
   a lock-up clutch capable of directly connecting said input and output shafts, said lock-up clutch further having an orifice formed therein in the vicinity of a facing thereof, said orifice communicating with a fluid chamber of said lock-up clutch and a converter fluid chamber; and flow restriction means for adjusting a flow rate through said orifice in a temperature dependent manner and mounted on a surface of said lock-up clutch proximate said orifice, said flow restriction means comprising a temperature sensitive arm portion mounted on said surface and having, at an end opposite a mounted end, a shutter portion arranged such that said flow restriction means is operable in at least three modes wherein, at substantially low fluid temperatures said arm portion is caused to bend in a first direction such that said shutter portion completely covers said orifice and, at medium fluid temperatures said arm assumes a relatively straight, neutral configuration whereat said shutter partially covers said orifice to allow partially restricted fluid flow therethrough and, at substantially high fluid temperatures said arm portion is caused to bend in a second direction opposite said first direction such that said shutter portion is moved completely away from said orifice so as to allow unrestricted flow of fluid through said orifice.

2. A lock-up type torque converter as set forth in claim 1, wherein said arm portion is made of a bimetal.

3. A lock-up type torque converter as set forth in claim 1, wherein said flow restriction means is mounted on said surface of said lock-up clutch opposite another surface mounting said facing.

4. A lock-up type torque converter as set forth in claim 1, wherein said flow restriction means is mounted on the same side of said lock-up clutch as that on which said facing is mounted.

5. A lock-up type torque converter as set forth in claim 1, wherein said lock-up clutch further includes a check wall portion formed on said surface mounting said flow restriction means at a location below said flow restriction means so as to position said flow restriction means between said check wall portion and said facing.

6. A lock-up type torque converter as set forth in claim 1, wherein said flow restriction means opens said orifice gradually in a fashion so as to smoothly correspond to a present fluid temperature.

7. A lock-up type torque converter as set forth in claim 1, wherein said flow restriction means is operable to completely open said orifice when said fluid reaches a predetermined target temperature.

8. A lock-up type torque converter as set forth in claim 1, wherein said arm portion is made of a shape memory alloy.

9. A lock-up type torque converter as set forth in claim 1, wherein the direction of curvature of said bimetal arm portion is parallel to the plane of said surface of said lock-up clutch on which said arm portion is mounted such that said shutter slides across said orifice along the plane of said surface mounting said arm portion.

10. A lock-up torque converter as set forth in claim 1, wherein said arm portion is mounted on said lock-up clutch at a radially inward end thereof and oriented radially with respect to rotation of said lock-up clutch.

* * * * *